United States Patent
Schuman et al.

(10) Patent No.: US 9,285,469 B1
(45) Date of Patent: Mar. 15, 2016

(54) MULTIPLATFORM GMTI RADAR WITH ENHANCED SNR, MONOPULSE

(71) Applicant: SRC, Inc., North Syracuse, NY (US)

(72) Inventors: Harvey K. Schuman, Fayetteville, NY (US); Daniel D. Thomas, Jr., Baldwinsville, NY (US)

(73) Assignee: SRC, Inc., North Syracuse, NY (US)

( * ) Notice: Subject to any disclaimer, the term of this patent is extended or adjusted under 35 U.S.C. 154(b) by 0 days.

(21) Appl. No.: 14/526,775

(22) Filed: Oct. 29, 2014

(51) Int. Cl.
*G01S 13/44* (2006.01)
*G01S 13/524* (2006.01)
*G01S 13/87* (2006.01)
*G01S 7/00* (2006.01)
*G01S 7/28* (2006.01)

(52) U.S. Cl.
CPC .............. *G01S 13/5248* (2013.01); *G01S 7/003* (2013.01); *G01S 7/2813* (2013.01); *G01S 13/44* (2013.01); *G01S 13/5244* (2013.01); *G01S 13/87* (2013.01)

(58) Field of Classification Search
CPC ............ G01S 13/5248; G01S 13/9029; G01S 13/5244; G01S 13/44; G01S 7/003; G01S 7/2813
USPC ................................. 342/17, 59, 80, 160, 161
See application file for complete search history.

(56) References Cited

U.S. PATENT DOCUMENTS

| | | | |
|---|---|---|---|
| 3,781,883 A | 12/1973 | Effinger et al. | |
| 4,689,623 A | 8/1987 | Schwab et al. | |
| 5,173,703 A | 12/1992 | Mangiapane et al. | |
| 5,173,706 A | 12/1992 | Urkowitz | |
| 6,018,311 A * | 1/2000 | David | G01S 7/292 342/101 |
| 6,144,333 A | 11/2000 | Cho | |
| 6,400,306 B1 * | 6/2002 | Nohara | G01S 13/5244 342/160 |
| 6,538,597 B1 | 3/2003 | Steudel | |
| 6,661,366 B2 * | 12/2003 | Yu | G01S 13/4409 342/13 |
| 6,661,376 B2 | 12/2003 | Maceo et al. | |
| 6,697,009 B2 * | 2/2004 | Yu | G01S 7/2813 342/13 |

(Continued)

OTHER PUBLICATIONS

Lee et al., "Optimum Beamformers for Monopulse Angle Estimation Using Overlapping Subarrays" IEEE Transactions on Antennas and Propagation [Online] 1994, 42 (5), pp. 651-657.

(Continued)

*Primary Examiner* — John B Sotomayor
*Assistant Examiner* — Marcus Windrich
(74) *Attorney, Agent, or Firm* — George R. McGuire; Daniel P. Malley; Bond Schoeneck & King, PLLC (57) ABSTRACT

The present invention is directed to a ground moving target (GMTI) radar that can detect targets, including dismounts, with very small minimum detectable velocities by combining signals from antennas on different spatially separated platforms in a main beam clutter-suppressing spatially adaptive process without requiring that the relative positions of the antenna phase centers be accurately tracked. The clutter nulling is in addition to that provided by the Doppler filters. The spatial displacement provides a narrow mainbeam clutter null reducing undesired target suppression. The clutter-suppressing spatially adaptive structure is used in both the sum and delta channels of the monopulse processor so that the beam distortion caused by the spatial nulling is compensated for, and the monopulse look-up process is preserved to maintain angle accuracy. Noncoherent integration is employed to recover signal to noise loss resulting from the uncertain relative locations of the platforms.

42 Claims, 4 Drawing Sheets

(56) References Cited

U.S. PATENT DOCUMENTS

| | | | |
|---|---|---|---|
| 6,861,976 B2 * | 3/2005 | Budic | G01S 7/023 342/195 |
| 2003/0117314 A1 * | 6/2003 | Yu | G01S 13/449 342/162 |
| 2003/0218565 A1 * | 11/2003 | Budic | G01S 7/023 342/90 |
| 2006/0140291 A1 * | 6/2006 | Thomas | H04L 27/265 375/260 |
| 2014/0266868 A1 * | 9/2014 | Schuman | G01S 13/325 342/25 B |

OTHER PUBLICATIONS

Nohara, "Design of a Space-Based Radar Signal Processor" IEEE Transactions on Aerospace and Electronic Systems [Online] 1998, 34 (2), pp. 366-377.

* cited by examiner

MULTIPLATFORM GMTI RADAR WITH ENHANCED SNR, MONOPULSE

BACKGROUND OF THE INVENTION

1. Field of the Invention

The present invention relates generally to radar processing systems, and particularly to Ground Moving Target Indicator (GMTI) radar.

2. Technical Background

The term radar is an acronym that stands for "radio detection and ranging." A radar system transmits radio frequency (RF) signals in a predetermined direction (i.e., a bearing) with the intention of contacting or illuminating moving or stationary objects, depending on the radar type, ("targets"). When the transmitted radar signal illuminates a target, a return signal is reflected back toward the radar receiver. The return signal is detected if it is stronger than the noise signals that may be present in the receiver. A target's bearing corresponds to the direction of the transmitted radar signal. Because the signal travels at the speed of light, the distance, or "range", is determined by measuring the time between signal transmission and the reception of the return signal. Radar has proved to be a very useful tool that can detect targets such as spacecraft, aircraft, vehicles, etc., within a predetermined region or search volume and provide the radar with the targets bearing, range, velocity, etc. This information provides military commanders, security personnel, or police with the intelligence they need to properly assess their situational awareness. Moreover, radar systems are now being used in many different applications including civilian air traffic control, search and reconnaissance, weather forecasting and tracking, and automotive traffic control, to name a few. Another radar application that has long garnered a great deal of interest relates to ground moving target indication (GMTI).

GMTI is an important application for "look-down" (i.e., airborne and space based systems) radar systems to sense ground targets using their motion. Because resources are limited, military commanders must use their assets smartly and efficiently. To do this, they require reliable intelligence in order to develop accurate "situation awareness" (SA). SA is about knowing where the enemy is, how big it is, where it is going and how fast it is getting there.

One of the drawbacks with GMTI radar relates to its ability (or inability) to distinguish slow-moving targets from background clutter. Clutter refers to the radar return signals that are reflected by terrain, buildings, trees and other such objects that are not of interest to the decision makers. GMTI radars use the Doppler Effect to distinguish moving targets from stationary ones. (When a target approaches the radar receiver, its velocity component parallel to the line of sight of the radar imparts a positive frequency shift if moving towards the radar, and a negative frequency shift if moving away from the radar. This frequency shift is referred to as Doppler and the relevant velocity component is the Doppler velocity. The use of Doppler radar provides a widely used means for distinguishing a target from stationary background (clutter). The Doppler frequency is calculated by calculating the ratio of twice the radial velocity over the wavelength of the radar signal (i.e., $F_D=(2)(V_R)/\lambda$. (This expression assumes a monostatic radar wherein the transmitter and receiver are collocated. In bistatic radar, the expression is modified to account for the differing velocity vector orientation with respect to the transmitter and receiver.) When a radar platform is moving (e.g., it is mounted on an aircraft), however, clutter returns at different angles will appear to move at different velocities and thus impart a spread of Doppler frequencies that can mask a moving target. By filtering both in angle and in Doppler, the radar processor can distinguish between clutter and target unless the target is moving too slowly. In this case, the competing clutter will arise from nearly the same angle and velocity as that of the target. This gives rise to the notion of "minimum detectable velocity (MDV)." Briefly stated, if the target is below the radar's MDV it will not be detected; on the other hand, if a target's Doppler velocity is above the radar's MDV, the GMTI radar can detect the target.

A limiting factor of GMTI radar arises from the fact that the MDV is primarily limited by the electrical size of the radar antenna aperture; sharper angle filtering requires a larger antenna aperture. The MDV is inversely related to the size of the radar antenna aperture. Thus, the MDV is reduced by increasing the size of the radar antenna aperture. However, since the GMTI radar (and its antenna) is part of the aircraft's payload, the size of the antenna aperture is limited by the size of the aircraft platform itself. What is needed therefore is a way to increase the size of the radar antenna aperture without the physical constraints outlined above.

In one approach that was considered, additional antennas were mounted on platforms maintained at a fixed separation. The antennas were widely separated spatially to increase the electrical size of the overall radar antenna aperture. Since the radar processor knew the precise position of each platform's antenna phase center, it also knew a priori what the phase offsets were between antennas. In other words, because the platforms were at a fixed separation, the computational burden placed on the processor was significantly reduced, making the system feasible. One obvious drawback to this approach relates to the fact that the system is rigid during usage.

Thus, a major drawback to mobile multiplatform GMTI radar relates to the fact that the relative positions of the platform antenna phase centers must be tracked to a small fraction of a wavelength. Conventional proposals to solve this ambiguity problem, and other problems associated with mobile distributed array multiplatform radar, make the assumption that the array phase centers can be precision tracked to fractions of a wavelength by some means, or that the array can be cohered by focusing on strong scatterers, transponders, and so forth. Such tracking accuracies are very difficult, if not impossible, to achieve with moving platforms at radar frequencies.

In one approach to mobile multiplatform GMTI radar, a multiplatform airborne experiment was performed. Specifically, the multiplatform radar operated as a mainlobe canceler, with one radar functioning as a main radar channel and the other(s) operating as auxiliary channels. Two drawbacks for this method were discovered. The first drawback relates to the fact that one of the radars alone (in the multiplatform system) must have adequate signal-to-noise ratio (SNR) for detection. Stated differently, the target scattered signals originating from the radar transmitters and received by the radars cannot be made to add coherently. Thus, the coherent gain of the multiplatform radar is lost. The second drawback relates to the lack of monopulse accuracy. Typically, the target angle is estimated accurately by combining two or more phase centers on one platform radar in a monopulse combiner. The combiner is calibrated to relate angle of arrival to the monopulse voltage ratio. The problem with the multiplatform radar is that the calibration curve does not apply if the auxiliary platform radar signals are combined with those of the main radar to cancel clutter. The clutter must be canceled in both monopulse channels.

What is needed, therefore, is a GMTI radar that can detect ground moving targets with very small minimum detectable velocities by combining signals in a clutter suppressing adaptive processing filter without requiring that the relative positions of the antenna phase centers be accurately tracked. What is further needed is a means for providing adequate signal-to-noise ratio (SNR) for detection. A method for canceling clutter in both monopulse channels is also needed.

SUMMARY OF THE INVENTION

The present invention addresses the needs described above by providing a multiplatform GMTI radar, with adaptive clutter suppression, that is configured to take advantage of the increase the electrical size of the radar antenna aperture using a distributed antenna array via multiple mobile platforms. The present invention substantially reduces the MDV by using a very large effective electrical aperture. This is accomplished by combining two or more mobile radars (disposed on separate ground vehicle, airborne or spaceborne platforms) so that they function as one. The associated large aperture allows cancellation of mainlobe clutter without causing severe target-gain loss. The present invention ensures that an adequate signal-to-noise ratio (SNR) for detection is provided through mainbeam preservation. The present invention also provides a method for retaining monopulse angle estimation. A key attribute of the present invention is that these capabilities are realized without the need to precisely navigate the relative locations of the platforms.

One aspect of the present invention is directed to a GMTI radar system that includes a signal input portion configured to receive first main channel radar return signals and second main channel radar return signals from a first main radar receiver and a second main radar receiver, respectively, both being disposed on a main airborne platform. The data input portion is also configured to receive first auxiliary channel radar return signals and second auxiliary channel radar return signals from at least one first auxiliary radar receiver and at least one second auxiliary radar receiver, respectively, both being disposed on at least one auxiliary airborne platform. The main airborne platform being independent and spatially separated from the auxiliary airborne platform. A plurality of Doppler filters are coupled to the signal input portion are configured to derive a first main clutter signal and a first main target signal from the first main channel radar return signals, at least one first auxiliary clutter signal and at least one first auxiliary target signal from the first auxiliary channel radar return signals, a second main clutter signal and a second main target signal from the second main channel radar return signals, and at least one second auxiliary clutter signal and at least one second auxiliary target signal from the second auxiliary channel radar return signals. A first adaptive cancelation circuit is coupled to the plurality of Doppler filters and is configured to generate a first weight vector that is a function of the first main clutter signal and the at least one first auxiliary clutter signal and apply the first weight vector to the at least one first auxiliary target signal to obtain a first weighted auxiliary target signal. The first adaptive cancelation circuit is further configured to combine the first weighted auxiliary target signal and the first main target signal to provide a first clutter suppressed target signal. A second adaptive cancelation circuit is coupled to the plurality of filters and is configured to generate a second weight vector that is a function of the second main clutter signal and the at least one second auxiliary clutter signal and apply the second weight vector to the at least one second auxiliary target signal to obtain a second weighted auxiliary target signal. The second adaptive cancelation circuit is further configured to combine the second weighted auxiliary target signal and the second main target signal to provide a second clutter suppressed target signal. A monopulse angle estimation circuit is coupled to the first adaptive processing circuit and the second adaptive processing circuit and is configured to provide a monopulse angle estimation ratio that is a function of the first clutter suppressed target signal and the second clutter suppressed target signal, but not a function of the first weight vector or the second weight vector.

In one embodiment, a target detector is configured to non-coherently integrate the first clutter suppressed target signals from successive coherent processing intervals (CPIs) to obtain a detection estimate.

In one version of the embodiment, the detection estimate is characterized by an improved signal to noise ratio (SNR) relative to the first clutter suppressed target signal and the second clutter suppressed target signal.

In one version of the embodiment, the target detector is configured to detect a target from the detection estimate when the detection estimate is greater than or equal to a predetermined threshold.

In one embodiment, the plurality of Doppler filters includes a plurality of first Doppler filters disposed in parallel to a plurality of first auxiliary Doppler filters and a plurality of second Doppler filters disposed in parallel to a plurality of second auxiliary Doppler filters. The plurality of first Doppler filters are configured to provide the first main clutter signal and the first main target signal, the plurality of first auxiliary Doppler filters are configured to provide the at least one first auxiliary clutter signal and the at least one first auxiliary target signal. The plurality of second Doppler filters are configured to provide the second main clutter signal and the second main target signal, and the plurality of second auxiliary Doppler filters are configured to provide the at least one second auxiliary clutter signal and the at least one second auxiliary target signal.

In one version of the embodiment, each of the first main clutter signal, the first main target signal, the at least one first auxiliary clutter signal, the at least one first auxiliary target signal, the second main clutter signal, the second main target signal, the at least one second auxiliary clutter signal, and the at least one second auxiliary target signal are characterized by a predetermined Doppler frequency and a predetermined range bin.

In one version of the embodiment, the at least one first main target signal includes a plurality of first main target signals provided by the plurality of first Doppler filters and the at least one first auxiliary clutter signal includes a plurality of first auxiliary clutter signals provided by the plurality of first auxiliary Doppler filters, the plurality of first auxiliary Doppler filters includes a first bank of first auxiliary filters coupled to the signal input portion and at least one second bank of first auxiliary filters disposed in parallel to the first bank of first auxiliary filters, the at least one second bank of first auxiliary filters being coupled to the signal input portion by way of a first fast time delay tap.

In one version of the embodiment, each of the plurality of first auxiliary Doppler filters corresponds to a predetermined Doppler frequency and a predetermined range bin, the predetermined range bin being characterized by a radar return delay time, the time delay of the first fast time delay tap being a fraction of a range bin duration.

In one version of the embodiment, the first weight vector is given by: $w = -R_{22}^{-1} R_{12}$, wherein $R_{22}$ denotes a covariance matrix estimate based on the plurality of first auxiliary clutter signals and $R_{12}$ denotes a covariance vector estimate based on the plurality of first main target signals and the plurality of first auxiliary clutter signals.

In one version of the embodiment, the at least one second main target signal includes a plurality of second main target signals provided by the plurality of second Doppler filters and the at least one second auxiliary clutter signal includes a plurality of second auxiliary clutter signals provided by the plurality of second auxiliary Doppler filters, the plurality of second auxiliary Doppler filters includes a first bank of second auxiliary filters coupled to the signal input portion and at least one second bank of second auxiliary filters disposed in parallel to the first bank of second auxiliary filters, the at least one second bank of second auxiliary filters being coupled to the signal input portion by way of a fast time delay tap.

In one version of the embodiment, each of the plurality of second auxiliary Doppler filters corresponds to a predetermined Doppler frequency and a predetermined range bin, the predetermined range bin being characterized by a radar return delay time, the time delay of the second fast time delay tap being a fraction of a range bin duration.

In one version of the embodiment, the second weight vector is given by: $w=-R_{22}^{-1}R_{12}$, wherein $R_{22}$ denotes a covariance matrix estimate based on the plurality of second auxiliary clutter signals and $R_{12}$ denotes a covariance vector estimate based on the plurality of second main target signals and the plurality of second auxiliary clutter signals.

In one embodiment, the first adaptive cancelation circuit further includes a first weight determination circuit configured to generate a first weight vector that is a function of the first main clutter signal and the at least one first auxiliary clutter signal. A first weight application circuit is configured to apply the first weight vector to the at least one first auxiliary target signal to obtain a weighted first auxiliary target signal. A first clutter cancelation circuit is configured to subtract the weighted first auxiliary target signal from the first main target signal to provide the first clutter suppressed target signal.

In one embodiment, the second adaptive cancelation circuit further includes a second weight determination circuit configured to generate a second weight vector that is a function of the second main clutter signal and the at least one second auxiliary clutter signal. A second weight application circuit is configured to apply the second weight vector to the at least one second auxiliary target signal to obtain a weighted second auxiliary target signal. A second clutter cancelation circuit is configured to subtract the weighted second auxiliary target signal from the second main target signal to provide the second clutter suppressed target signal.

In one version of the embodiment, the first weight determination circuit and the second weight determination circuit each include a range selection circuit configured to determine a size of a range cell-under-test (CUT) based on a measure of the homogeneity of the at least one first auxiliary clutter signal and the at least one second auxiliary clutter signal, respectively, and wherein each CUT is centered on a predetermined range bin.

In one version of the embodiment, the size of the cell-under-test is based on clutter signals from a relatively large number of adjacent range bins when the clutter signals are relatively homogeneous, and wherein the size of the cell-under-test is based on clutter signals from one range bin or a relatively small number of adjacent range bins when the clutter signals are not homogeneous.

In one version of the embodiment, the first weight application circuit and the second weight application circuit apply the first weight vector and the second weight vector to the at least one first auxiliary target signal and the at least one second auxiliary target signal, respectively, using a sliding window operation.

In one version of the embodiment, the sliding window is incremented by generating a new first weight vector and a new second weight vector for each CUT.

In one embodiment, the first weight vector and the second weight vector are given by: $w=-R_{22}^{-1}R_{12}$, wherein $R_{22}$ denotes a covariance matrix estimate based on a plurality of auxiliary clutter signals and $R_{12}$ denotes a covariance vector estimate based on a plurality of main target signals and the plurality of auxiliary clutter signals.

In one embodiment, the monopulse angle estimation ratio is given by:

$$\frac{\Delta}{\Sigma} = \frac{y \ y'}{y+y'},$$

and wherein y is the first clutter suppressed target signal and y' is the second clutter suppressed target signal.

In another aspect, the present invention is directed to a GMTI radar system that includes a non-adaptive signal processing circuit that is configured to provide a first main clutter signal and a first main target signal from a plurality of first main channel radar return signals obtained from a first main radar receiver and provide a second main clutter signal and a second main target signal from a plurality of second main channel radar return signals obtained from a second main radar receiver. The first main radar receiver and the second main radar receiver are disposed on a first movable platform. The non-adaptive signal processing circuit is further configured to provide at least one first auxiliary clutter signal and at least one first auxiliary target signal from a plurality of first auxiliary channel radar return signals obtained from at least one first auxiliary radar receiver and provide at least one second auxiliary clutter signal and at least one second auxiliary target signal from a plurality of second auxiliary channel radar return signals obtained from at least one second auxiliary radar receiver. The at least one first auxiliary radar receiver and the at least one second auxiliary radar receiver are disposed on at least one auxiliary movable platform. The main movable platform is independent and spatially separated from the auxiliary movable platform. An adaptive signal processing circuit is configured combine a first weighted auxiliary target signal and the first main target signal to provide a first clutter suppressed target signal and combine a second weighted auxiliary target signal and the second main target signal to provide a second clutter suppressed target signal. The first weighted auxiliary target signal and the second weighted auxiliary target signal are a function of a first adaptive weight vector and a second adaptive weight vector, respectively. A monopulse angle estimation circuit is coupled to the adaptive signal processing circuit and is configured to provide a monopulse angle estimation ratio that is a function of the first clutter suppressed target signal and the second clutter suppressed target signal, but not a function of the first weight vector or the second weight vector.

In one embodiment, the non-adaptive signal processing circuit includes a signal input portion configured to receive the plurality of first main channel radar return signals and the plurality of second main channel radar return signals from the first main radar receiver and the second main radar receiver, respectively, the data input portion also being configured to receive the plurality of first auxiliary channel radar return signals and the plurality of second auxiliary channel radar return signals from the at least one first auxiliary radar receiver and the at least one second auxiliary radar receiver, respectively.

In one version of the embodiment, the non-adaptive signal processing circuit includes a plurality of Doppler filters coupled to the signal input portion, the plurality of Doppler filters being configured to: filter the first main channel radar return signals to obtain the first main clutter signal and the first main target signal; filter the first auxiliary channel radar return signals to obtain the at least one first auxiliary clutter signal and at least one first auxiliary target signal; filter the second main channel radar return signals to obtain the second main clutter signal and the second main target signal from; and filter the second auxiliary channel radar return signals to obtain the at least one second auxiliary clutter signal and at least one second auxiliary target signal.

In one embodiment, the adaptive signal processing circuit includes: a weight determination processing circuit configured to determine the first adaptive weight vector as a function of the first main clutter signal and the at least one first auxiliary clutter signal, the weight determination processing circuit being further configured to determine the second adaptive weight vector as a function of the second main clutter signal and the at least one second auxiliary clutter signal; a weight application circuit configured to apply the first adaptive weight vector to the at least one first auxiliary target signal to obtain the weighted first auxiliary target signal, the weight application circuit being also configured to apply the second adaptive weight vector to the at least one second auxiliary target signal to obtain a weighted second auxiliary target signal; and a clutter cancelation circuit configured to subtract the weighted first auxiliary target signal from the first main target signal to obtain the first clutter suppressed target signal, the clutter cancelation circuit being further configured to subtract the weighted second auxiliary target signal from the second main target signal to obtain the second clutter suppressed target signal.

In one version of the embodiment, the weight determination circuit includes a range selection circuit configured to determine a size of a range cell-under-test (CUT) based on a measure of the homogeneity of the at least one first auxiliary clutter signal and the at least one second auxiliary clutter signal, respectively, and wherein each CUT is centered on a predetermined range bin.

In one version of the embodiment, the size of the range cell-under-test is based on clutter signals from a relatively large number of adjacent range bins when the clutter signals are relatively homogeneous, and wherein the size of the cell-under-test is based on clutter signals from one range bin or a relatively small number of adjacent range bins when the clutter signals are not homogeneous.

In one version of the embodiment, the weight application circuit applies the first adaptive weight vector and the second adaptive weight vector to the at least one first auxiliary target signal and the at least one second auxiliary target signal, respectively, using a sliding window operation.

In one version of the embodiment, the sliding window is incremented by generating a new first weight vector and a new second weight vector for each CUT.

In one embodiment, the system further includes a target detector configured to non-coherently integrate the first clutter suppressed target signals from successive coherent processing intervals (CPIs) to obtain a detection estimate.

In one version of the embodiment, the detection estimate is characterized by an improved signal to noise ratio (SNR) relative to the first clutter suppressed target signal and the second clutter suppressed target signal.

In one version of the embodiment, the target detector is configured to detect a target from the detection estimate when the detection estimate is greater than or equal to a predetermined threshold.

In one embodiment, the first adaptive weight vector and the second adaptive weight vector are given by: $w=-R_{22}^{-1}R_{12}$, wherein $R_{22}$ denotes a covariance matrix estimate based on a plurality of auxiliary clutter signals and $R_{12}$ denotes a covariance vector estimate based on a plurality of main target signals and the plurality of auxiliary clutter signals.

In one embodiment, the monopulse angle estimation ratio) is given by:

$$\frac{\Delta}{\Sigma} = \frac{y-y'}{y+y'},$$

and wherein y is the first clutter suppressed target signal and y' is the second clutter suppressed target signal.

In one embodiment, the data input portion, the non-adaptive processing portion and the adaptive processing portion are disposed at a location remote from the first GMTI radar receiver or the at least one auxiliary GMTI radar receiver, and wherein the first coherent radar return samples and the second radar return samples are provided to the data input portion via a data link.

In one embodiment, the GMTI radar system includes a radar transmitter that is configured as a monostatic radar transmitter or as a bistatic radar transmitter.

In one version of the embodiment, the bistatic radar transmitter is disposed aboard a separate and remote airborne or spaceborne platform.

In one embodiment, the at least one auxiliary airborne platform includes a plurality of auxiliary airborne platforms.

In one embodiment, the main airborne platform and the at least one auxiliary airborne platform are separated by a cross range dimension ($\Delta Y$) that is substantially within a range of about 5-20 wavelengths ($\lambda$) of a transmitted radar signal, and wherein a lateral separation dimension ($\Delta X$) and an altitude separation between the main airborne platform and the at least one auxiliary airborne platforms is substantially unconstrained.

In one embodiment, the signal input portion is disposed on either the first platform or the at least one second platform.

In one embodiment, the signal input portion is coupled to the first main radar receiver, the second main radar receiver, the at least one first auxiliary radar receiver or the at least one second auxiliary radar receiver via a data link.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

It should also be understood that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION

Figure 2:
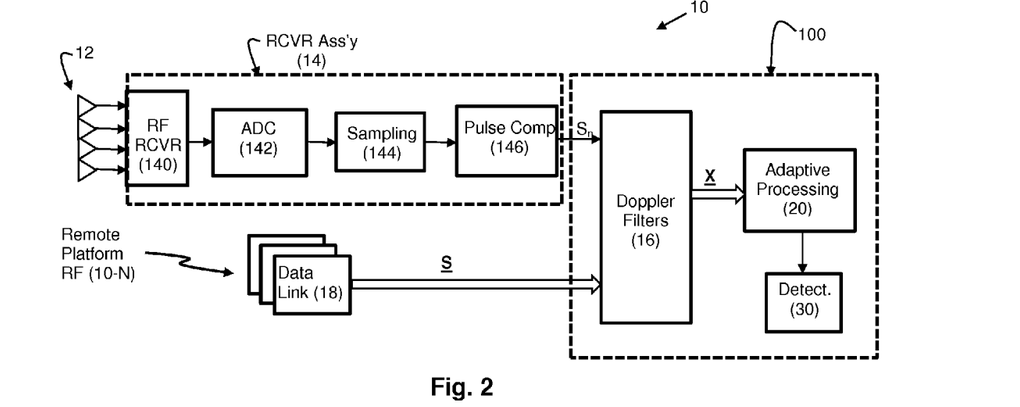
FIG. 2 is a block diagram of a multiplatform GMTI system in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the system of the present invention is shown in FIG. 2, and is designated generally throughout by reference numeral 10.

The present invention is directed to a ground moving target (GMTI) radar 10 that is configured to detect targets, including dismounts, with very small minimum detectable velocities by combining signals from antennas 12 on different spatially separated platforms (1, 2) in a main beam clutter-suppressing spatially adaptive process without requiring that the relative positions of the antenna phase centers be accurately tracked. The clutter nulling is in addition to that provided by the Doppler filters 16. The spatial displacement provides a narrow mainbeam clutter null reducing undesired target suppression. The clutter-suppressing spatially adaptive structure (200, 202) is used in both the sum and delta channels (206, 208) of the monopulse processor 400 so that the beam distortion caused by the spatial nulling is compensated for, and the monopulse look-up process is preserved to maintain angle accuracy. Noncoherent integration 300 is employed to recover signal to noise loss resulting from the uncertain relative locations of the platforms. See, FIG. 4.

Figure 1:
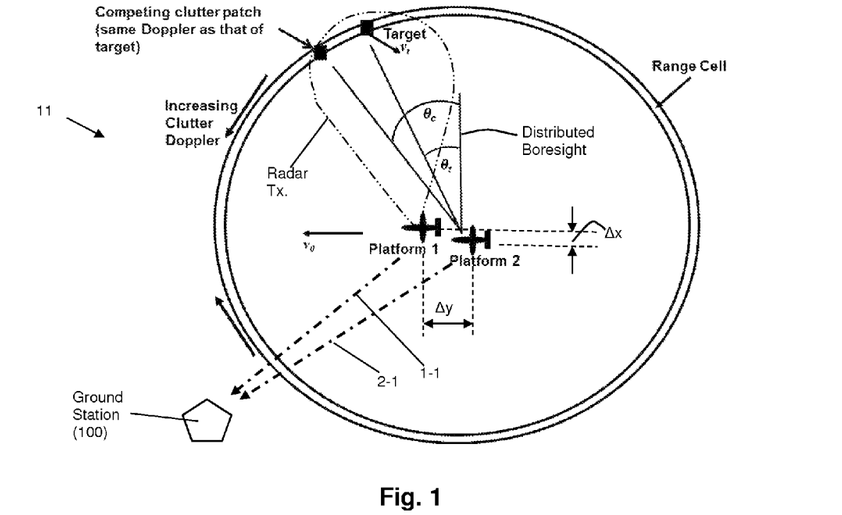
FIG. 1 is a diagram illustrating the geometry of the multiplatform environment of the present invention.

Referring to FIG. 1, a diagram illustrating the geometry of the multiplatform environment 11 is disclosed. Two aircraft (platform 1 and platform 2) are shown at the center of the drawing. As the drawing indicates, the radial velocity $v_o$ of the clutter is at a positive maximum in the direction that the platforms are traveling and at a negative minimum in the opposite direction. The radial absolute velocity is at a minimum amidships. The Doppler frequency of the clutter also is at a positive maximum in the direction of travel and at a negative minimum directly behind the aircraft tails.

For ease of illustration, only two aircraft "platforms" are considered in this view and the radar system aboard each platform employs only two channels, although the method of the present invention can be readily extended to any number of platforms flying in loose formation and any number of channels on each platform. The number of channels equals the number of platforms. The platforms further are assumed to move at close to the same velocity in approximately the same direction during the data capture of one coherent processing interval (CPI), and the antenna arrays are assumed to be roughly parallel. With the following caveat, the platforms can otherwise be arbitrarily located with respect to one another. The cross range dimension ($\Delta Y$) should be limited to several aperture sizes; and the potential target range should be at least several times the platform altitude for the best results. When the platforms are spaced in this manner, overly narrow grating lobes that may fill in due to internal clutter motion and uncompensated platform acceleration are avoided. Note that the down range separation dimension ($\Delta X$) and the altitude separation of the two platforms are not substantially constrained.

Platform 1 is shown transmitting a radar signal that illuminates a target and a competing patch of clutter disposed in the same range cell. Both platforms receive the radar return signals, and data received by the platforms is transferred to one "master" platform, or a remote ground station 100, for "Fast Time" Space-Time Adaptive Processing (STAP). In another embodiment of the present invention, one of the platforms 1 or 2 can be configured to perform the adaptive processing. The adaptive processing can include intraplatform channels as well as interplatform channels. The interplatform channels enable detection of very slow moving targets; the intraplatform channels enable detection of faster moving targets. As shown herein, multiplatform GMTI in accordance with the present invention can provide an order-of-magnitude or more reduction in MDV over that of single platform GMTI, and without the need to precisely navigate the platforms.

The clutter is spread in Doppler across the main beam because of the motion of the platform. That clutter spread can hide slowing moving targets within the main beam. Spatial-only adaptivity applied directly to the data, prior to Doppler processing, will try to cancel the entire main beam thus preventing target detection. The GMTI STAP method of this invention relies on forming very narrow Doppler cells, with very lobe sidelobes, prior to spatial-only adaptive nulling. Adaptive nulling is applied to each of these Doppler cells in succession in searching for a target. By confining the competing clutter to a narrow Doppler cell, the clutter is in fact confined to a narrow azimuth angular portion of the main beam as well. Thus the adaptivity need only create one spatial null at the azimuth of this competing clutter. The narrower the null, the smaller the minimum detectable velocity of the target. A narrow null requires a large aperture. The multiplatform is a means of providing a large aperture. A key factor thus is that the multiplatform separation creates a narrow null thereby allowing target and competing clutter to be near each other in azimuth within the main beam.

The present invention is shown herein as being configured as a monostatic radar, where one of the platform radars transmits the radar signal and all of the radars in the distributed array receive the return signals. Alternatively, the present invention may be configured as a bistatic radar wherein the radar transmitter is disposed aboard a separate and remote (ground, airborne or space based) platform. As before, all of the radars in the distributed array receive the return signals.

As embodied herein and depicted in FIG. 2, a block diagram of a multiplatform GMTI system 10 in accordance with one embodiment of the present invention is disclosed. In this embodiment, the adaptive processing portion 100 is shown as being disposed on one of the platforms shown in FIG. 1. Specifically, the radar platform includes an antenna portion 12 coupled to a receiver assembly 14. The receiver assembly 14 includes an RF receiver 140 that is typically configured to downconvert, amplify and filter the RF signals captured by the antenna assembly 12. The downconverted signals are provided to an analog-to-digital converter (ADC) and sampled to provide in-phase and quadrature signal components to the pulse compressor 146. (The pulse compression may also be performed at the end of the adaptive processing). At this point, a digital signal $S_n$ is provided to the Doppler filters 16 in the adaptive processing portion 100. The multi-platform GMTI system 10 is also shown to include a data link portion 18 that is configured to provide digital signals $\underline{s}$ from one or more auxiliary platforms 10'. The digital signals are provided to the Doppler filter bank 16 disposed in the adaptive processing portion 100. Thus, the adaptive processing may be performed on one of the airborne platforms (1, 2) shown in FIG. 1.

The antennas on the respective platforms should have comparable gains to ensure what is referred to as "mainlobe cancellation." Otherwise, if the aux channels have lower gain, the computed weights will be of a magnitude that will increase system noise that would offset some, or most, of the benefit of clutter/interference suppression provided by the present invention. The interference can be radar clutter or spatially localized signals generated outside of the system (such as jamming).

In another embodiment of the present invention, the adaptive processing portion 100 may be located at a location that is remote from the platforms (1, 2). The data $\underline{s}$ obtained by the main radar and the auxiliary radar(s) channels is stored, time stamped and transmitted to a common location (See, FIG. 1) for linear combining and processing. In this case, the Doppler filters 16 are only coupled to the data link portion 18 and receive all of the digital signals $\underline{s}$ from remote platforms via data link 18. Those of ordinary skill in the art will appreciate that either embodiment is fully supported by the present invention. Moreover, the subject matter of FIGS. 3-5, directed to the adaptive processor 100 and described below, is equally applicable to both embodiments.

Figure 3:
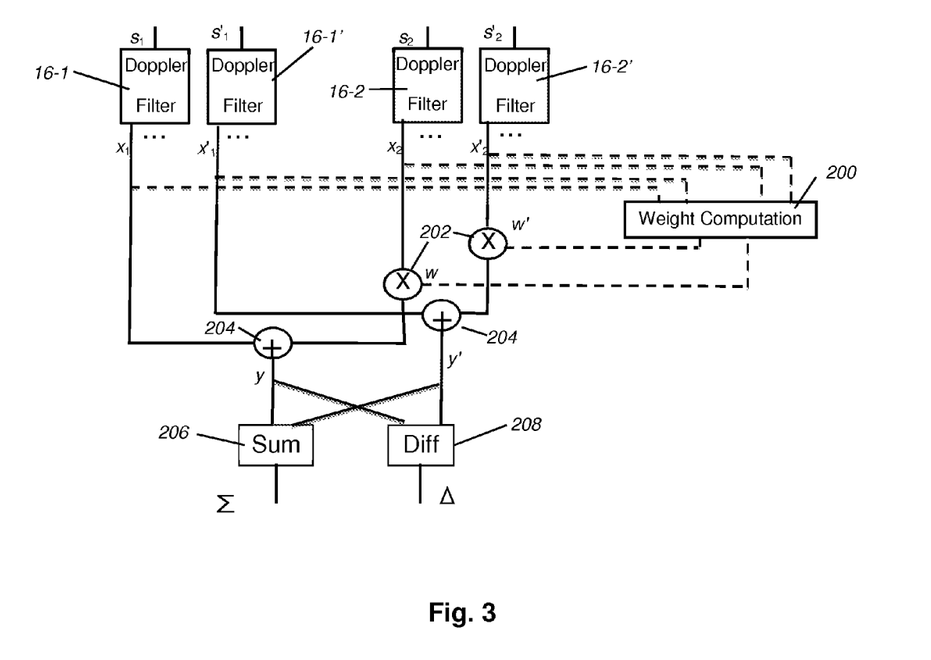
FIG. 3 is a high level block diagram of the adaptive processing elements depicted in FIG. 2.

As embodied herein and depicted in FIG. 3, a high level block diagram of the adaptive processor 100 depicted in FIG. 2 is disclosed. The main platform signals are denoted with the subscript "1" (i.e., $s_1$, $s'_1$), and the signals from the auxiliary platform are denoted with the subscript "2" (i.e., $s_2$, $s'_2$). There are two channels for each platform, the second channel being denoted by a "prime" (e.g., $s'_1$ $s'_2$). From a high level, two channels ($s_1$, $s_2$) are used to determine the sum ($\Sigma$) beam value and two channels ($s'_1$, $s'_2$) are used to determine the delta ($\Delta$) beam value for monopulse processing. The antenna gain and direction for each channel are similar in order to support main beam cancellation and monopulse matching.

The system 100 includes Doppler filters (16-1, 16-1', 16-2, 16-2') that are configured to receive the data outputs ($s_1$, $s_1'$, $s_2$, and $s_2'$) from their respective platforms (1, 2) i.e., either directly from the RF receiver assembly or via a data link 18. The Doppler filters (16) are configured to provide clutter signals ($x_1$, $x_1'$, $x_2$, and $x_2'$) to the weight computation block 200. All processing is done on a per burst basis, with the pulse length being, just by way of example, approximately 10% of the pulse repetition interval (PRI), which is typical. The Doppler filters (16) perform pulse-to-pulse Doppler processing for each range bin. The dimension of the Doppler filter equals the number of pulses, which is customary in Doppler radar processing. The Doppler filters effectuate initial clutter cancellation, and target gain. The Doppler filters (16) are configured to output uncancelled clutter residue signals (i.e., $x_1$, $x_1'$, $x_2$, and $x_2'$) that are confined to a relatively small angular spread due to the well-known correlation of Doppler and angle for airborne (or otherwise moving platform) radar. The pulse compression and the Doppler filtering performed in each of the four channels needs to be the same, in order to support monopulse processing. Those skilled in the art should appreciate that because of the Doppler spread created by the motion of the platform, there is higher Doppler clutter that is not easily cancelled with a single platform antenna and associated processing. Because GMTI of very slowly moving targets is very difficult for single platform antenna systems, the value of creating a large aperture using multiple platforms is apparent.

In reference to FIG. 3, the Doppler filters 16 are coupled to the weight computation block 200. Specifically, weights are applied to the auxiliary channels ($x_1'$, $x_2'$); and the weighted auxiliary channels are combined with their respective main channels ($x_1$, $x_2$) to perform clutter cancelation. For each range/Doppler bin, the weights are separately computed to spatially null the residual clutter that was not cancelled by the Doppler filters. The clutter suppression weights are obtained from data in other range cells, where presumably no target is present.

The corresponding Doppler frequencies on the two channels are processed as follows. The linear combination of the Doppler filtered Channels 1 and 2 result in a clutter signal, y ($\theta_c$) given by:

$$y(\theta_c) = x_1(\theta_c) + w^* x_2(\theta_c)$$

$$y(\theta_c) = e_c f_1(\theta_c) + n_1 + w^*(e_c \exp(j\psi_c) f_2(\theta_c) + n_2) \quad (1)$$

Where,
$x_1(\theta_c) = e_c f_1(\theta_c) + n_1$;
$x_2(\theta_c) = e_c \exp(j\psi_c) f_2(\theta_c) + n_2$;
$e_c$=complex clutter spectral component;
$f_1$=antenna 1 complex antenna pattern;
$f_2$=antenna 2 complex antenna pattern;
$n_1$=channel 1 receiver noise; and
$n_2$=channel 2 receiver noise.

Here, w denotes the complex weight to be applied to suppress the clutter and maintain signal strength, the symbol * denotes the complex conjugate and $\psi_c$ denotes the phase corresponding to the delay of the clutter signal between the two channels. The delay $\psi_c$ is given by the expression:

$$\psi_c = \frac{2\pi}{\lambda} S \sin(\theta_c)$$

where S denotes the distance between antennas 1 and 2. Further, the clutter direction vector and the antennas form a plane, and $\theta_c$ denotes the angle of the direction vector from the normal to the distance line S in that plane. The target signal arrives in a corresponding plane at angle $\theta_t$ with respect to the normal to the S distance line in the "target" plane. The target signal in the linear combination of the two platform channels (Channel 1 and 2) is given by:

$$y(\theta_t) = e_1 f_1(\theta_t) + n_1 + w^*(e_t \exp(j\psi_t) f_2(\theta_t) + n_2) \quad (2)$$

The second channel should be viewed as a type of coherent canceller. Reference is made to U.S. Pat. No. 3,202,990, which is incorporated herein by reference as though fully set forth in its entirety for another example of a coherent canceler. While certain concepts are identical, the present invention represents a marked improvement over the '990 patent disclosure. The '990 patent disclosure is referenced herein to provide the reader with a conceptual understanding of a coherent canceller. Using the convention employed in the '990 patent therefore, channel 1 is referred to herein as the "main channel," and the other channel(s) are referred to as the "auxiliary (aux) channels."

In reference to FIG. 3 and equations (1-3), the weights are applied to the auxiliary channels ($x_2$, $x'_2$) by the combiner blocks 202. The application of the weights w, w' minimizes the interference/clutter power. The interference voltage is given by Eq. 1. For a large ratio of clutter power to noise, the weight that minimizes the mean square of the clutter voltage is given by:

$$w = -\frac{f_1^*(\theta_c)}{f_2^*(\theta_c)} \exp(j\psi_c) \quad (3)$$

In accordance with the teachings of the present invention, however, there is no need to precisely navigate the platforms in order to determine $\psi_c$ and thus w. We instead determine w directly from:

$$w = -R_{22}^{-1} R_{12} \quad (4)$$

where $R_{22}$ denotes the aux channel clutter-plus-noise covariance and $R_{12}$ is the main-aux clutter-plus-noise covariance.

Figure 4:
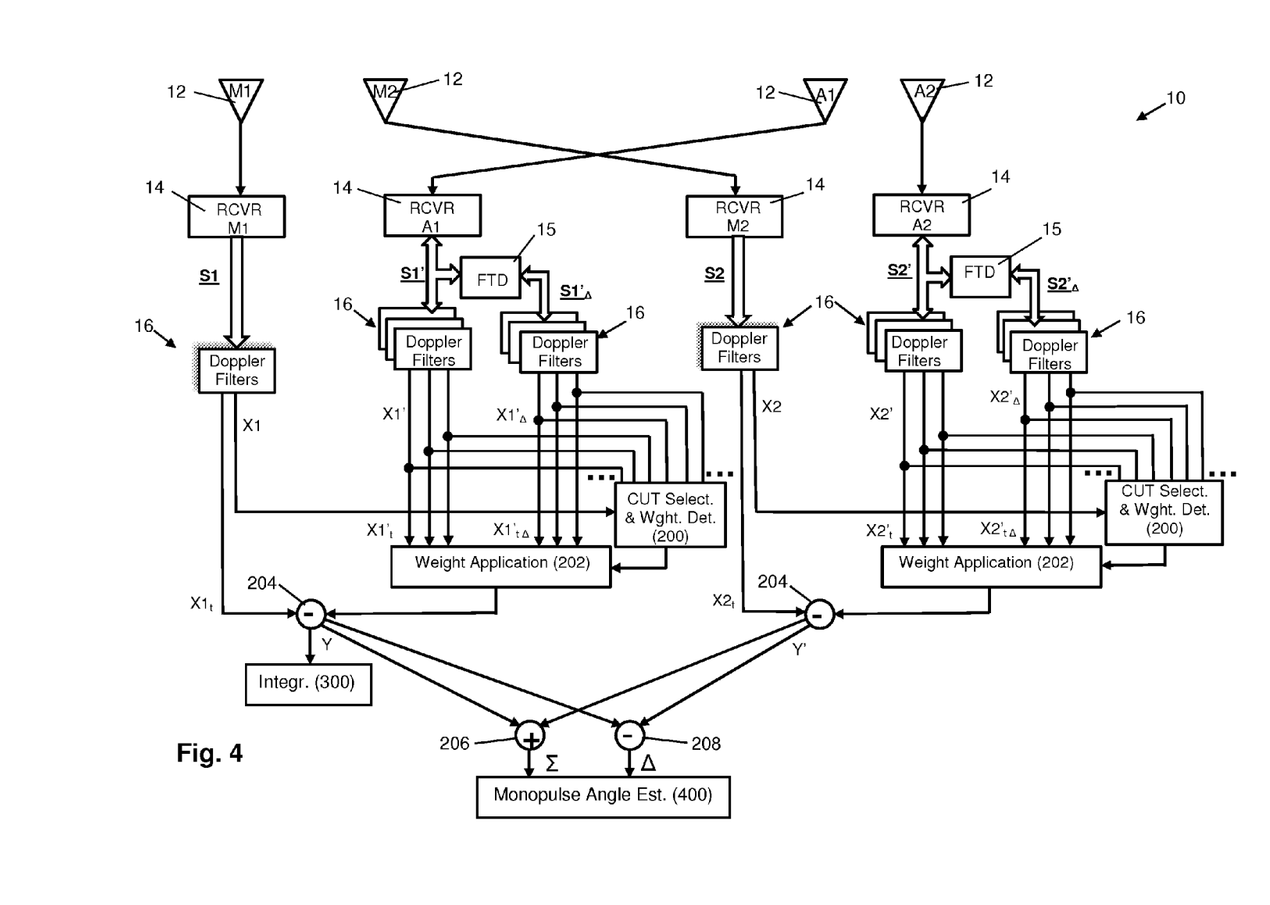
FIG. 4 is a detailed diagram of the adaptive processing elements depicted in FIG. 2.

The processor 100 can be extended to several degrees of freedom (DOFs) by introducing more platforms, more time taps (See, e.g., FIG. 4) spaced about a half range cell or so on the auxiliary platform antenna outputs and several adjacent Doppler cells for each of these taps. The scalar weight then becomes a weight vector of a number of elements, N, equal to the product of the number of aux platforms (1 less than total number of platforms), number of time taps per platform, and number of these aforementioned adjacent Doppler cells per time tap. The weight vector is again given by:

$$w = -R_{22}^{-1} R_{12} \quad (5)$$

Where $R_{22}$ denotes the clutter plus noise covariance matrix of all N aux channels and $R_{12}$ the row matrix of clutter plus noise covariances of each aux channel with the main channel. Moreover, because the present invention employs a second set of channels on the platforms—denoted by primed variables ($s'_1$, $s'_2$)—and both channels have the same antennas, the interference suppression weights for the first and second combiners (202) are the same or similar. The primed variables ($s'_1$, $s'_2$) are coupled to fast time delay (FTD) elements 15; the FTD elements compensate for errors in estimating the down range separation distance between platforms.

The averaging implied by the covariances of Equations 4 and 5 is approximated by averaging over several range cells of interference or clutter data, in typical Space Time Adaptive Processing (STAP) fashion. This procedure can be implemented monostatically with a transmitter on one of the receive platforms, or bistatically with a transmitter on a remote platform. Further, it would be evident to those practiced in STAP that the method can be directly extended to any number of platforms flying in loose coordination.

Referring back to FIG. 3, the unweighted main channel target signals ($x_1$, $x'_1$) are combined with the weighted auxiliary channel target signals ($x_2$, $x'_2$) at blocks 204 to obtain clutter suppressed outputs (y, y'). (Note that the y channel is processed separately—not shown in this view—for target detection). If a predetermined threshold is exceeded, then the clutter suppressed outputs (y, y') are summed (block 206) and differenced (block 208) and the complex ratio computed. As described herein, these values are independent of the weights derived in the weight computation block, and therefore, these values can be referenced in a look up table for target detection purposes. In fact, the values must be largely independent of the cancellation weights, w and w', in order for the table to remain accurate. Note that the ratio (referred to as the monopulse angle estimation ratio) is given by:

$$\frac{\Delta}{\Sigma} = \frac{y - y'}{y + y'} \quad (6)$$

Here:

$\Delta = e_t f_1(\theta_t) + n_1 + w^*(e_t \exp(j\psi_t) f_2(\theta_t) = n_2)$ $-[e_t f_1'(\theta_t)\exp(j\psi_{t0}) + n_1' + w'^*(e_t \exp(j\psi_t) f_2'(\theta_t)\exp(j\psi_{t0}) + n_2')]$ $\Sigma = e_t f_1(\theta_t) + n_1 + w^*(e_1 \exp(j\psi_t) f_2(\theta_t) + n_2)$ $+[e_t f_1'(\theta_t)\exp(j\psi_{t0}) + n_1' + w'^*(e_t \exp(j\psi_t) f_2'(\theta_t)\exp(j\psi_{t0}) + n_2')]$ where $\psi_{t0}$ denotes the relative phase of the target signal between the unprimed and primed channels. The relative phase of the target signal is the same in all platforms and given by:

$$\psi_{t0} = \frac{2\pi}{\lambda} A \sin(\theta_t)$$

where A denotes the distance between phase centers of Channel 1 and Channel 1' antennas. Further, as indicated above, $f_1 = f_2$ and $f_1' = f_2'$. Then, in accordance with these conditions and strong clutter (clutter limited scenarios), it follows from Eq. 3 that w and w' are nearly equal. (The target is in the far field of the multiplatform antenna array so that the competing clutter also is in the far field, and because the antenna array on one platform is duplicated on the others and the platforms fly parallel trajectories, $\psi_c$ is the same in determination of w and w'.) The monopulse angle estimation ratio therefore reduces to:

$$\frac{\Delta}{\Sigma} = \frac{f_1 - f_1' \exp(j\psi_t) + (n_1 + w^* n_2 - n_1' - w'^* n_2')/(e_t(1 + w^* \exp(j\psi_t)))}{f_1 + f_1' \exp(j\psi_t) + (n_1 + w^* n_2 + n_1' + w'^* n_2')/(e_t(1 + w^* \exp(j\psi_t)))}$$

From Eq. 3:

$1 + w^* \exp(j\psi_t) - 1 - \exp(j\psi_t - \psi_c))$

Thus, for $\psi_t - \psi_c \neq 2p\pi$, with p being an integer and large signal to noise ($|e_t|^2$ large with respect to receiver noise powers), the monopulse angle estimation ratio is approximated by:

$$\frac{\Delta}{\Sigma} = \frac{f_1 - f_1' \exp(j\psi_t)}{f_1 + f_1' \exp(j\psi_t)}$$

This expression is clearly independent of the weights.

As embodied herein and depicted in FIG. 4, a detailed diagram of the adaptive processing elements depicted in FIGS. 2 and 3 is disclosed. As before, the main platform 1 includes at least two main antennas 12 (M1, M2), and there is at least one auxiliary platform 2 that includes at least two auxiliary antennas 12 (A1, A2). Each antenna is coupled to a receiver 14. The purpose of the receiver 14 is to extract a weak radar echo signal from its corresponding antenna 12 and provide a digital signal s to the Doppler filters. To be specific, the first stage of the receiver typically includes a low noise amplifier (LNA). The amplified signal is filtered to eliminate signals not in the RF pass band. The amplified and filtered analog signal is typically downconverted to one or more intermediate frequencies. After downconversion, the resultant analog signal is converted into a digital signal by an ADC. In FIG. 4, therefore, the output of the receiver M1 is a digital baseband signal $s_1$; the outputs of receivers M2, A1 and A2 are also digital signals $s_1'$, $s_2$, and $s_2'$, respectively. Each digital baseband signal, e.g., $s_1$, represents multiple signals that are provided to a block of Doppler filters 16.

Specifically, each Doppler filter 16 provides an output signal $x_n$ that is a "space-time snapshot" that corresponds to a particular antenna, a particular Doppler cell within the processing interval, and a particular range gate. Thus, each output signal could be denoted $x_{1mn}$, wherein 1 corresponds to the range gate, M corresponds to the Doppler cell, and n corresponds to the antenna. For sake of clarity, however, the Doppler filtered clutter signals ($x_1$, $x_1'$, $x_2$, and $x_2'$) only show the antenna designation. The Doppler filter bank 16 coupled to the main receivers (M1, M2), for example, include multiple Doppler filters; each Doppler filter in the bank 16 represents one range gate and one Doppler cell (in the CPI). The main channel digital signal outputs ($x_1$, $x_2$) represent therefore a primary main antenna output and a secondary main antenna output, respectively, for one Doppler cell, in one particular range gate.

As noted above, the output of receiver A2 may be connected to the adaptive processing portion 100 by way of a data link 18 (not shown in this view) in order to provide signal $s_1'$ to the auxiliary Doppler filter bank 16. The signal $s_1'$ is also provided to a fast time delay tap 15, which is configured to provide a fast time delay that is less than the time between range samples. As shown in FIG. 4, there are three Doppler filters for each aux channel and each FTD output ($s_1'\Delta$). The architecture of FIG. 4, thus provides six (6) degrees of adaptive freedom. There are seven Doppler filter inputs (for a given Doppler cell under test at a given range gate) provided to the cell-under-test (CUT) and weight determination block 200. This is explained at the outset, because the operations outlined below must be repeated for each Doppler filter (as a function of Doppler cell, range).

Accordingly, the Doppler filtered output signal $x_1$ (for each Doppler cell and range gate) is provided to the cancelation block 204 where it is combined with the six weighted output signals ($x_1'$, $x_1'_A$) from the auxiliary platform A1. The weight determination block 200 (shown in detail at FIG. 5) creates a six (6) dimensional weight vector w. Note that the clutter signals ($x_1$, $x_1'$, $x_2$, and $x_2'$) are in the same, or in a nearby, range bin and may have the same Doppler frequency as the target signal. Thus, the Doppler filter is shown as outputting both a clutter signal and a target signal (e.g., $x_1$, $x_{1t}$). The clutter statistics are assumed to be the same in range cells close to the range cell under test for a target; this is a typical STAP requirement. The competing clutter—i.e., clutter that has the same Doppler as that of the target—is localized in angle by virtue of a relatively narrow Doppler cell. In other words, the Doppler cell is assumed to be sufficiently narrow so that a single weight adequately suppresses the competing clutter.

In reference to weight application block 202, the weight vector is applied to the aux channel target signals in one CUT in a sliding window operation (as discussed below). Each increment of the window is a new adaptive process which generates a new weight vector for each range bin cell (i.e., the CUT) being examined. At this point, only the one-half of the diagram of FIG. 4 has been explained. The second set of channels (M2, A2) is identical to the first set of channels (M1, A1), and thus, a discussion of the various blocks shown in FIG. 4 is redundant and omitted for brevity's sake. However, the CUT & Weight determination block 200—in each of the first set of channels (M1, A1) and second set of channels (M2, A2)—outputs a 1×6 weight vector that is applied (by weight application block 202) to the six auxiliary Doppler filter target signal outputs.

As noted above, the second set of channels ($x_2$, $x_2'$) is added to the platforms so that the interference or clutter suppression weights for the two combiners (206, 208) are the same and the angle of the detected target signal can be determined with standard monopulse radar calibration tables. The first main channel signal is combined with the first aux channel to obtain y (with suppressed interference without suffering undue target signal suppression), and the second main channel signal is combined with the second aux channel to obtain y' with similar result. These signals in turn are combined to form sum and difference signals the ratio of which, in combination with a calibration table relating these signals to angles of arrival, may be used to determine the direction of a target. As noted previously, this result is largely independent of the cancellation weights, w and w', in order for the table to remain accurate.

The angle-of-arrival procedure, described above, is performed by the monopulse angle estimation block 400 after non-coherent detection is performed by the integrator 300. The angle-of-arrival procedure is only carried out for locations where a target has been detected. The adaptive process described herein suppresses clutter at the expense of some signal power, i.e., lowered signal to noise ratio (SNR). This is especially true when the targets of interest are slowly moving and the competing clutter thus is "main beam clutter" as is the case here. The multiplatform radar of the present invention recovers SNR by noncoherently combining sum channel signals (y) from successive bursts (i.e., multiple CPIs). Specifically, detection is performed by non-coherently adding the amplitudes of the sum channel (y) output signals. The sum of the channel (y) output signals is compared to a predetermined threshold. The improvement from noncoherent addition obviously applies only to detection and not to angle estimation.

Figure 5:
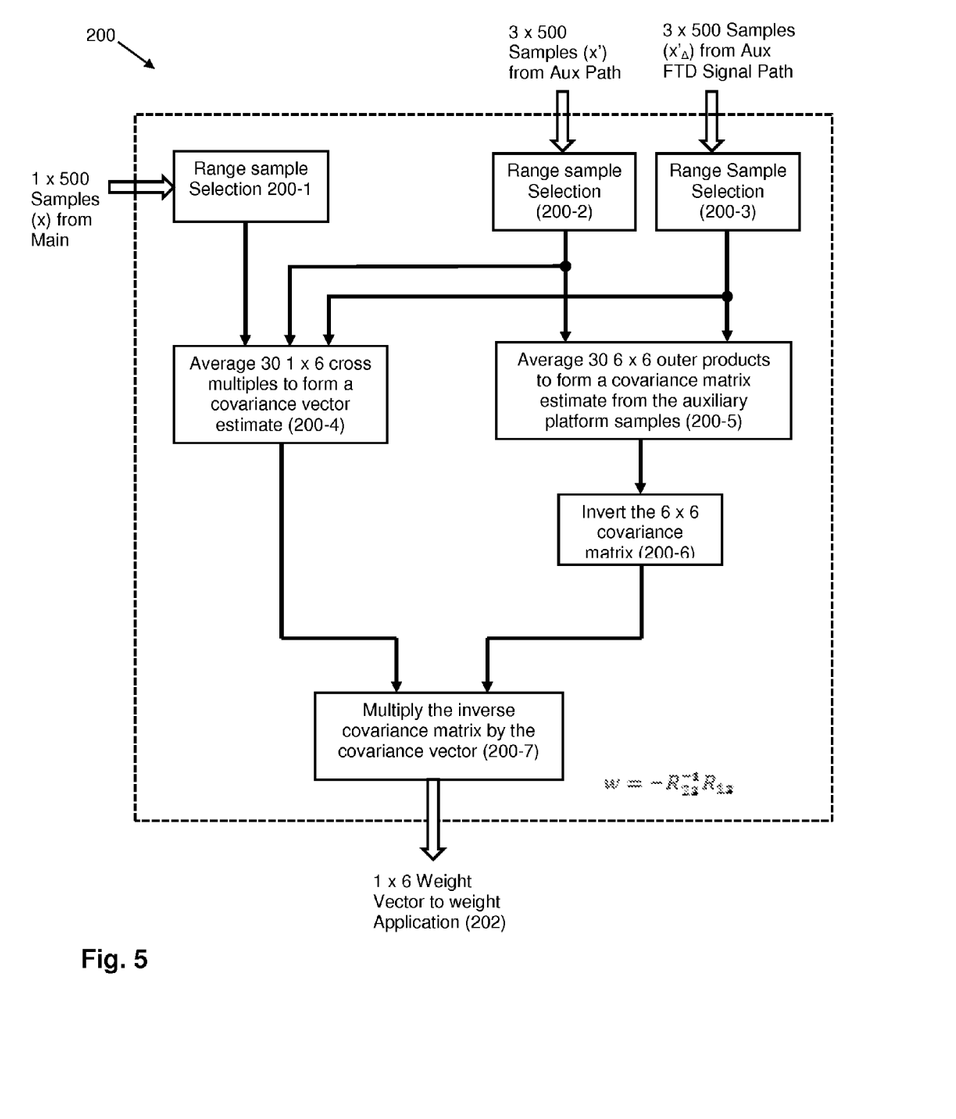
FIG. 5 is a detailed diagram of the weight determination block depicted in FIG. 4 in accordance with the present invention.

As embodied herein and depicted in FIG. 5, a detailed diagram of the weight determination block 202 shown in FIG. 4 is disclosed. There are three range sample selection blocks shown. The main channel range selection box 200-1 obtains 500 signal range samples (i.e., $x_1$) from the corresponding Doppler filter. The 500 refers to the total number of range cells to be processed in searching for targets. Because there are three Doppler filters associated with the auxiliary signal path, a (3×500) sample signal vector is input into the range sample selection block 200-2. Since the fast time delayed (FTD) auxiliary signal path also provides three signal inputs, the range sample selection block 200-3 also requires a (3×500) sample signal vector input. Briefly stated, the first stage of the weight determination procedure inputs 500 range cells (sample vectors). As discussed further below, the number of range samples applied in computing the weights for detection for one "test" range cell is determined by multiplying the number of DOFs (that is, the order of the covariance matrix) by two or more, preferably, five (5); since the number of DOFs is six (6), the minimum desired number of range samples for computing the weight vector is thirty (30). For homogeneous clutter, as defined below, all five hundred range cells could be processed (detection determination and angle estimation) with this one weight vector. Otherwise a sliding window method may be applied, as discussed below.

Before describing the remaining blocks in the diagram, some explanation of the range selection process is provided. The present invention is directed toward applying GMTI to the problem of detecting slow-moving targets on the ground. A particularly desirable target is the dismount, i.e., a walking person. The problem with dismount GMTI is that the target is very close in Doppler to the ground clutter. This leaves spatial clutter nulling, in particular main beam clutter nulling, as the approach used by the present invention.

As described herein, main beam nulling requires an auxiliary platform (with full gain) that is displaced spatially from the main in order to form a narrow null in the main beam of the main channel. If this approach is not taken, the clutter null looks like a delta beam that significantly lowers the gain on a target that is nearby in angle. The spatial displacement requires a multi-platform architecture with the auxiliary antennas on a separate off board platform. It is further assumed that the off board platform will be at a small but non zero different range, and at a small but non zero different platform Doppler towards the target. The adaptive process 200 is therefore carried out at the output of the Doppler filters, with different time delays and different Dopplers available to it. Process 200 is configured to adaptively select the best Doppler match and the best time delay match. The FTD auxiliary channels also allow the adaptive processor 200 to compensate for errors in estimating the down range separations of the platforms.

The adaptive process shown in FIG. 5 represents an incrementing of a CUT window and it generates a new weight vector just for the range bin cells examined, i.e. the CUT. The purpose of the range sample selection blocks (200-1, 200-2, and 200-3) is to determine the homogeneity of the range samples. If the clutter is homogeneous, then all the range samples can be used to drive the covariance process and just one weight vector is created. For the purposes of this invention, clutter is homogeneous over a span of range cells if the clutter Doppler spectra for each angular direction are invariant with range over the span. Homogeneity is affected by terrain and geometry. Generally, the terrain should be of constant type: prairie, forested, urban, littoral, aquatic, etc. Regarding geometry, the homogeneity constraint primarily is that the elevation angle varies very little over the range span. In this case, the weight vector is applied to all of the range samples within the span. As described previously, each Doppler cell is processed separately, albeit with its neighboring Doppler bins. Because of platform motion, within a Doppler cell only stationary scatterers within a very limited angular width contribute to clutter. Further, stationary clutter "discretes" such as water towers and bridges are just like the many other sources of ground clutter. The weights are generated primarily from this stationary clutter.

Thus, the number of range cells processed can vary based on the clutter statistics (or homogeneity) versus range. There can be one adaptive process for all ranges or a number of adaptive processes at different ranges. This depends on whether the clutter is homogeneous versus range or non-homogeneous versus range. The number of range cells processed in a weight vector determination is referred to as a window. The range cells are used as training data (Also referred to as secondary data). The training data is employed to form a weight vector.

The "sliding window" refers to a centering of the window (i.e., training data range cells) on a range cell under test (CUT). The weights obtained from the window are applied to the range samples. (The CUT and adjacent "guard cells" are omitted from the weight determination process to prevent the adaptive filter from cancelling the target). The window "slides" along as other cells under test are processed to maintain centering upon the CUT. Block 200 performs this process. The process addresses the non-homogeneous clutter issue. The span of range cells of interest in searching for targets can be non-homogeneous generally but locally homogeneous within small sections of the span and thus the window tracks variations in homogeneity. As indicated above, clutter is deemed to be "non-homogeneous" when the clutter statistics change materially versus range. For example, if there is farm land in the foreground and mountainous terrain in the background, the clutter statistics will be quite different. Platform geometry can also impact the clutter statistics. For high platform altitudes, the statistics of the terrain in the near ranges can be significantly different from that of distant ranges.

To summarize, multiple weight formations are required for non-homogeneous clutter. Each computation comes from a "sliding window" adaptive process of range samples. The most computationally extensive case is to perform a CUT based adaptive weight vector computation for every range cell.

Conversely, homogeneous clutter has relatively similar clutter statistics with respect to range. For homogeneous clutter, the adaptive processing block will replace the multiple computationally intensive sliding window adaptive processes with a few weight determinations using a large number of cells or with one weight determination for all of the range cells. In the latter instance there is but one window, and one weight vector is computed and applied to all range samples. Because of the large number of cells, targets would only minimally affect the weights.

Once the range samples are selected, step 200-4 averages thirty (30) 1×6 cross multiples to form a covariance vector estimate. In step 200-5, the selected aux channel Doppler range samples and the selected aux FTD Doppler range samples are employed to average thirty (30) 6×6 outer products to form an aux channel covariance matrix estimate. Note that the number of range samples employed is at least 5 times the number of auxiliary degrees of freedom. This is well understood in the art as necessary to form a good covariance matrix. In step 200-6, the aux channel covariance matrix estimate is inverted and multiplied by the covariance matrix obtained in step 200-4, to obtain the 1×6 weight vector w.

In reference to FIG. 4, the 1×6 weight vector w is applied to the target samples $X_{1t}$ and, in the secondary channels, to $X_{2t}$ in order to obtain the clutter suppressed outputs (y, y'). Thus, the Doppler clutter not adequately cancelled by the Doppler filter that would prevent GMTI detection in conventional systems is addressed by the main beam spatial nulling described herein. Moreover, the present invention uses the clutter suppressed outputs (y, y') to obtain monopulse ratio. Moreover, the target angle measurement is not affected by the nulling.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A GMTI radar system comprising:
    a signal input portion configured to receive first main channel radar return signals and second main channel radar return signals from a first main radar receiver and a second main radar receiver, respectively, both being disposed on a main airborne platform, the data input portion also configured to receive first auxiliary channel radar return signals and second auxiliary channel radar return signals from at least one first auxiliary radar receiver and at least one second auxiliary radar receiver, respectively, both being disposed on at least one auxiliary airborne platform, the main airborne platform being independent and spatially separated from the auxiliary airborne platform;
    a plurality of Doppler filters coupled to the signal input portion, the plurality of Doppler filters being configured to derive: a first main clutter signal and a first main target signal from the first main channel radar return signals; at least one first auxiliary clutter signal and at least one first auxiliary target signal from the first auxiliary channel radar return signals; a second main clutter signal and a second main target signal from the second main channel radar return signals; and at least one second auxiliary clutter signal and at least one second auxiliary target signal from the second auxiliary channel radar return signals;
    a first adaptive cancelation circuit coupled to the plurality of Doppler filters, the first adaptive cancelation circuit being configured to generate a first weight vector that is a function of the first main clutter signal and the at least one first auxiliary clutter signal and apply the first weight vector to the at least one first auxiliary target signal to obtain a first weighted auxiliary target signal, the first adaptive cancelation circuit being further configured to combine the first weighted auxiliary target signal and the first main target signal to provide a first clutter suppressed target signal;
    a second adaptive cancelation circuit coupled to the plurality of filters, the second adaptive cancelation circuit being configured to generate a second weight vector that is a function of the second main clutter signal and the at least one second auxiliary clutter signal and apply the second weight vector to the at least one second auxiliary target signal to obtain a second weighted auxiliary target signal, the second adaptive cancelation circuit being further configured to combine the second weighted auxiliary target signal and the second main target signal to provide a second clutter suppressed target signal; and
    a monopulse angle estimation circuit coupled to the first adaptive processing circuit and the second adaptive processing circuit, the monopulse angle estimation circuit being configured to provide a monopulse angle estimation ratio that is a function of the first clutter suppressed target signal and the second clutter suppressed target signal, but not a function of the first weight vector or the second weight vector.

2. The system of claim 1, further comprising a target detector configured to non-coherently integrate the first clutter suppressed target signals from successive coherent processing intervals (CPIs) to obtain a detection estimate.

3. The system of claim 2, wherein the detection estimate is characterized by an improved signal to noise ratio (SNR) relative to the first clutter suppressed target signal and the second clutter suppressed target signal.

4. The system of claim 2, wherein the target detector is configured to detect a target from the detection estimate when the detection estimate is greater than or equal to a predetermined threshold.

5. The system of claim 1, wherein the plurality of Doppler filters includes a plurality of first Doppler filters disposed in parallel to a plurality of first auxiliary Doppler filters and a plurality of second Doppler filters disposed in parallel to a plurality of second auxiliary Doppler filters, and wherein the plurality of first Doppler filters are configured to provide the first main clutter signal and the first main target signal, the plurality of first auxiliary Doppler filters are configured to provide the at least one first auxiliary clutter signal and the at least one first auxiliary target signal, the plurality of second Doppler filters are configured to provide the second main clutter signal and the second main target signal, and the plurality of second auxiliary Doppler filters are configured to provide the at least one second auxiliary clutter signal and the at least one second auxiliary target signal.

6. The system of claim 5, wherein each of the first main clutter signal, the first main target signal, the at least one first auxiliary clutter signal, the at least one first auxiliary target signal, the second main clutter signal, the second main target signal, the at least one second auxiliary clutter signal, and the at least one second auxiliary target signal are characterized by a predetermined Doppler frequency and a predetermined range bin.

7. The system of claim 5, wherein the at least one first main target signal includes a plurality of first main target signals provided by the plurality of first Doppler filters and the at least one first auxiliary clutter signal includes a plurality of first auxiliary clutter signals provided by the plurality of first auxiliary Doppler filters, the plurality of first auxiliary Doppler filters includes a first bank of first auxiliary filters coupled to the signal input portion and at least one second bank of first auxiliary filters disposed in parallel to the first bank of first auxiliary filters, the at least one second bank of first auxiliary filters being coupled to the signal input portion by way of a first fast time delay tap.

8. The system of claim 7, wherein each of the plurality of first auxiliary Doppler filters corresponds to a predetermined Doppler frequency and a predetermined range bin, the predetermined range bin being characterized by a radar return delay time, the time delay of the first fast time delay tap being a fraction of a range bin duration.

9. The system of claim 7, wherein the first weight vector is given by: $w=-R_{22}^{-1}R_{12}$, wherein $R_{22}$ denotes a covariance matrix estimate based on the plurality of first auxiliary clutter signals and $R_{12}$ denotes a covariance vector estimate based on the plurality of first main target signals and the plurality of first auxiliary clutter signals.

10. The system of claim 5, wherein the at least one second main target signal includes a plurality of second main target signals provided by the plurality of second Doppler filters and the at least one second auxiliary clutter signal includes a plurality of second auxiliary clutter signals provided by the plurality of second auxiliary Doppler filters, the plurality of second auxiliary Doppler filters includes a first bank of second auxiliary filters coupled to the signal input portion and at least one second bank of second auxiliary filters disposed in parallel to the first bank of second auxiliary filters, the at least one second bank of second auxiliary filters being coupled to the signal input portion by way of a fast time delay tap.

11. The system of claim 10, wherein each of the plurality of second auxiliary Doppler filters corresponds to a predetermined Doppler frequency and a predetermined range bin, the predetermined range bin being characterized by a radar return delay time, the time delay of the second fast time delay tap being a fraction of a range bin duration.

12. The system of claim 10, wherein the second weight vector is given by: $w=-R_{22}^{-1}R_{12}$, wherein $R_{22}$ denotes a covariance matrix estimate based on the plurality of second auxiliary clutter signals and $R_{12}$ denotes a covariance vector estimate based on the plurality of second main target signals and the plurality of second auxiliary clutter signals.

13. The system of claim 1, wherein the first adaptive cancelation circuit further comprises:
a first weight determination circuit configured to generate a first weight vector that is a function of the first main clutter signal and the at least one first auxiliary clutter signal;
a first weight application circuit configured to apply the first weight vector to the at least one first auxiliary target signal to obtain a weighted first auxiliary target signal; and
a first clutter cancelation circuit configured to subtract the weighted first auxiliary target signal from the first main target signal to provide the first clutter suppressed target signal.

14. The system of claim 13, wherein the second adaptive cancelation circuit further comprises:
a second weight determination circuit configured to generate a second weight vector that is a function of the second main clutter signal and the at least one second auxiliary clutter signal;
a second weight application circuit configured to apply the second weight vector to the at least one second auxiliary target signal to obtain a weighted second auxiliary target signal; and
a second clutter cancelation circuit configured to subtract the weighted second auxiliary target signal from the second main target signal to provide the second clutter suppressed target signal.

15. The system of claim 14, wherein the first weight determination circuit and the second weight determination circuit each include a range selection circuit configured to determine a size of a cell-under-test (CUT) based on a measure of the homogeneity of the at least one first auxiliary clutter signal and the at least one second auxiliary clutter signal, respectively, and wherein each CUT is centered on a predetermined range bin.

16. The system of claim 15, wherein the size of the cell-under-test is based on clutter signals from a relatively large number of adjacent range bins when the clutter signals are relatively homogeneous, and wherein the size of the cell-under-test is based on clutter signals from one range bin or a relatively small number of adjacent range bins when the clutter signals are not homogeneous.

17. The system of claim 14, wherein the first weight application circuit and the second weight application circuit apply the first weight vector and the second weight vector to the at least one first auxiliary target signal and the at least one second auxiliary target signal, respectively, using a sliding window operation.

18. The system of claim 17, wherein the sliding window is incremented by generating a new first weight vector and a new second weight vector for each CUT.

19. The system of claim 1, wherein the first weight vector and the second weight vector are given by: $w=-R_{22}^{-1}R_{12}$, wherein $R_{22}$ denotes a covariance matrix estimate based on a plurality of auxiliary clutter signals and $R_{12}$ denotes a covariance vector estimate based on a plurality of main target signals and the plurality of auxiliary clutter signals.

20. The system of claim 1, wherein the monopulse angle estimation ratio) is given by:

$$\frac{\Delta}{\Sigma} = \frac{y \; y'}{y + y'},$$

and wherein y is the first clutter suppressed target signal and y' is the second clutter suppressed target signal.

21. A GMTI radar system comprising:
a non-adaptive signal processing circuit configured to provide a first main clutter signal and a first main target signal from a plurality of first main channel radar return signals obtained from a first main radar receiver and provide a second main clutter signal and a second main target signal from a plurality of second main channel radar return signals obtained from a second main radar receiver, the first main radar receiver and the second main radar receiver being disposed on a first movable platform, the non-adaptive signal processing circuit being further configured to provide at least one first auxiliary clutter signal and at least one first auxiliary target signal from a plurality of first auxiliary channel radar return signals obtained from at least one first auxiliary radar receiver and provide at least one second auxiliary clutter signal and at least one second auxiliary target signal from a plurality of second auxiliary channel radar return signals obtained from at least one second auxiliary radar receiver, the at least one first auxiliary radar receiver and the at least one second auxiliary radar receiver being disposed on at least one auxiliary movable platform, the main movable platform being independent and spatially separated from the auxiliary movable platform;
an adaptive signal processing circuit configured combine a first weighted auxiliary target signal and the first main target signal to provide a first clutter suppressed target signal and combine a second weighted auxiliary target signal and the second main target signal to provide a second clutter suppressed target signal, the first weighted auxiliary target signal and the second weighted auxiliary target signal being a function of a first adaptive weight vector and a second adaptive weight vector, respectively; and a monopulse angle estimation circuit coupled to the adaptive signal processing circuit, the monopulse angle estimation circuit being configured to provide a monopulse angle estimation ratio that is a function of the first clutter suppressed target signal and the second clutter suppressed target signal, but not a function of the first weight vector or the second weight vector.

22. The system of claim 21, wherein the non-adaptive signal processing circuit includes a signal input portion configured to receive the plurality of first main channel radar return signals and the plurality of second main channel radar return signals from the first main radar receiver and the second main radar receiver, respectively, the data input portion also being configured to receive the plurality of first auxiliary channel radar return signals and the plurality of second auxiliary channel radar return signals from the at least one first auxiliary radar receiver and the at least one second auxiliary radar receiver, respectively.

23. The system of claim 22, wherein the non-adaptive signal processing circuit includes a plurality of Doppler filters coupled to the signal input portion, the plurality of Doppler filters being configured to: filter the first main channel radar return signals to obtain the first main clutter signal and the first main target signal; filter the first auxiliary channel radar return signals to obtain the at least one first auxiliary clutter signal and at least one first auxiliary target signal; filter the second main channel radar return signals to obtain the second main clutter signal and the second main target signal from; and filter the second auxiliary channel radar return signals to obtain the at least one second auxiliary clutter signal and at least one second auxiliary target signal.

24. The system of claim 21, wherein the adaptive signal processing circuit comprises:
  a weight determination processing circuit configured to determine the first adaptive weight vector as a function of the first main clutter signal and the at least one first auxiliary clutter signal, the weight determination processing circuit being further configured to determine the second adaptive weight vector as a function of the second main clutter signal and the at least one second auxiliary clutter signal;
  a weight application circuit configured to apply the first adaptive weight vector to the at least one first auxiliary target signal to obtain the weighted first auxiliary target signal, the weight application circuit being also configured to apply the second adaptive weight vector to the at least one second auxiliary target signal to obtain a weighted second auxiliary target signal; and
  a clutter cancelation circuit configured to subtract the weighted first auxiliary target signal from the first main target signal to obtain the first clutter suppressed target signal, the clutter cancelation circuit being further configured to subtract the weighted second auxiliary target signal from the second main target signal to obtain the second clutter suppressed target signal.

25. The system of claim 24, wherein the weight determination circuit includes a range selection circuit configured to determine a size of a range cell-under-test (CUT) based on a measure of the homogeneity of the at least one first auxiliary clutter signal and the at least one second auxiliary clutter signal, respectively, and wherein each CUT is centered on a predetermined range bin.

26. The system of claim 25, wherein the size of the range cell-under-test is based on clutter signals from a relatively large number of adjacent range bins when the clutter signals are relatively homogeneous, and wherein the size of the cell-under-test is based on clutter signals from one range bin or a relatively small number of adjacent range bins when the clutter signals are not homogeneous.

27. The system of claim 24, wherein the weight application circuit applies the first adaptive weight vector and the second adaptive weight vector to the at least one first auxiliary target signal and the at least one second auxiliary target signal, respectively, using a sliding window operation.

28. The system of claim 27, wherein the sliding window is incremented by generating a new first weight vector and a new second weight vector for each CUT.

29. The system of claim 21, further comprising a target detector configured to non-coherently integrate the first clutter suppressed target signals from successive coherent processing intervals (CPIs) to obtain a detection estimate.

30. The system of claim 29, wherein the detection estimate is characterized by an improved signal to noise ratio (SNR) relative to the first clutter suppressed target signal and the second clutter suppressed target signal.

31. The system of claim 30, wherein the target detector is configured to detect a target from the detection estimate when the detection estimate is greater than or equal to a predetermined threshold.

32. The system of claim 21, wherein the first adaptive weight vector and the second adaptive weight vector are given by: $w = -R_{22}^{-1} R_{12}$, wherein $R_{22}$ denotes a covariance matrix estimate based on a plurality of auxiliary clutter signals and $R_{12}$ denotes a covariance vector estimate based on a plurality of main target signals and the plurality of auxiliary clutter signals.

33. The system of claim 21, wherein the monopulse angle estimation ratio) is given by:

$$\frac{\Delta}{\Sigma} = \frac{y \; y'}{y + y'},$$

and wherein y is the first clutter suppressed target signal and y' is the second clutter suppressed target signal.

34. The system of claim 21, wherein the data input portion, the non-adaptive processing portion and the adaptive processing portion are disposed at a location remote from the first GMTI radar receiver or the at least one auxiliary GMTI radar receiver, and wherein the first coherent radar return samples and the second radar return samples are provided to the data input portion via a data link.

35. The system of claim 21, wherein the GMTI radar system includes a radar transmitter that is configured as a monostatic radar transmitter or as a bistatic radar transmitter.

36. The system of claim 35, wherein the bistatic radar transmitter is disposed aboard a separate and remote airborne or spaceborne platform.

37. The system of claim 21, wherein the auxiliary movable platform includes a plurality of auxiliary movable platforms.

38. The system of claim 21, wherein the main airborne platform and the at least one auxiliary airborne platform are separated by a cross range dimension ($\Delta Y$) that is substantially within a range of about 5-20 wavelengths ($\lambda$) of a transmitted radar signal, and wherein a lateral separation dimension (ΔX) and an altitude separation between the main airborne platform and the at least one auxiliary airborne platforms is substantially unconstrained.

39. The system of claim 21, wherein the signal input portion is disposed on either the first platform or the at least one second platform.

40. The system of claim 21, wherein the signal input portion is coupled to the first main radar receiver, the second main radar receiver, the at least one first auxiliary radar receiver or the at least one second auxiliary radar receiver via a data link.

41. The system of claim 21, wherein the main movable platform includes a ground-based platform, an airborne platform or a spaceborne platform.

42. The system of claim 21, wherein the auxiliary movable platform includes a ground-based platform, an airborne platform or a spaceborne platform.

* * * * *